US006963583B1

(12) United States Patent
Foti

(10) Patent No.: US 6,963,583 B1
(45) Date of Patent: Nov. 8, 2005

(54) GENERIC CALL SERVER AND METHOD OF CONVERTING SIGNALING PROTOCOLS

(75) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 886 days.

(21) Appl. No.: 09/676,791

(22) Filed: Sep. 29, 2000

(51) Int. Cl.[7] .............................. H04J 3/22; H04J 3/16
(52) U.S. Cl. ...................... 370/467; 709/227; 370/410; 370/352
(58) Field of Search ................................ 370/400, 401, 370/410, 465, 466, 467, 230, 235, 395.2, 370/351–356; 379/216.01, 207.14, 209.01, 379/219, 229; 709/227, 228, 242, 230

(56) References Cited

U.S. PATENT DOCUMENTS

| | | | | |
|---|---|---|---|---|
| 5,434,852 | A * | 7/1995 | La Porta et al. | 370/385 |
| 5,943,408 | A | 8/1999 | Chen et al. | 379/207 |
| 6,219,348 | B1 * | 4/2001 | Allen et al. | 370/354 |
| 6,480,493 | B1 * | 11/2002 | Christie et al. | 370/395.2 |
| 6,584,186 | B1 * | 6/2003 | Aravamudan et al. | 379/201.03 |
| 6,625,258 | B1 * | 9/2003 | Ram et al. | 379/88.13 |

FOREIGN PATENT DOCUMENTS

| | | |
|---|---|---|
| EP | 0935364 A2 | 8/1999 |
| WO | WO 00 42760 | 7/2000 |

OTHER PUBLICATIONS

Anquetil L-P et al: "Media Gateway Control Protocol and Voice Over IP Gateways. MGCP and VOIP Gateways will offer seamless interworking of new VOIP Networks with Today's Telephone Networks" Electrical Communication, Alcatel. Brussels, BE, Apr. 1, 1999 pp. 151-157, XP000830045; ISSN: 0013-4252, p. 154.

International Search Report No. PCT/CA01/01340 dated Mar. 22, 2002.

* cited by examiner

*Primary Examiner*—Ajit Patel
(74) *Attorney, Agent, or Firm*—Smith, Danamraj & Youst, P.C.

(57) ABSTRACT

A generic call server in a hybrid 2G/3G telecommunications network having a plurality of network components that utilize a plurality of different signaling protocols. The call server performs call-control functions and interfaces between any two network components selected from the plurality of components. A Generic Call-control State Machine (GCSM) performs call-control functions that are common to all of the protocols. A plurality of external signaling systems interface between the GCSM and the network components and perform call-control functions that are specific to each protocol. The generic call server may also include a Media Gateway (MGW) Handler that acts as a media signaling protocol handling server and interfaces between the GCSM and a media gateway.

9 Claims, 5 Drawing Sheets

GENERIC CALL SERVER AND METHOD OF CONVERTING SIGNALING PROTOCOLS

BACKGROUND OF THE INVENTION

1. Technical Field of the Invention

This invention relates to telecommunication systems and, more particularly, to a generic call server and method of converting signaling protocols that utilizes a Generic Call-control State Machine (GCSM) for handling call-control signaling between a plurality of different signaling systems.

2. Description of Related Art

It is anticipated that telecommunications networks will be hybrid networks containing both second generation (2G) and third generation (3G) components and areas of service for years to come. In a typical hybrid network, a number of different signaling protocols may be utilized including, for example, the Internet Protocol (IP), the International Telecommunications Union—Telecommunications Standardization Sector (ITU-T) H.323 and H.248 protocols, the Internet Engineering Task Force (IETF) Session Initiation Protocol (SIP), the Mobile Application Part (MAP), the ANSI-41 Intersystem Signaling protocol, the Signal System 7 (SS7) protocol, the Integrated Services Digital Network (ISDN) User Part (ISUP) protocol, and the Bearer Independent Call Control (BICC) protocol, an extension of ISUP.

An analysis of various call cases, performed for different combinations of networks and different types of subscribers, results in the functional block diagram illustrated in FIG. 1. This diagram illustrates the call-control functional components that are required in a hybrid network 10 in order to handle the various combinations of signaling systems that are currently utilized. Extensions to protocols are indicated by a "+" sign. Block 11 represents the functionality required for a call-control handler that is capable of handling all combinations of the existing signaling protocols. The handler is functionally divided into a plurality of servers and a plurality of media gateway controllers (MGCs). Several types of servers exist. The different types of servers can be grouped into the following four groups:

- Servers that understand only one type of protocol. These servers provide subscriber services. They do not control a media gateway (MGW), and therefore have no MGC functionality. These are illustrated in FIG. 1 as blocks 12 and 13.
- Servers that map between different types of protocols in order to bridge different transport schemes such as packet-switched and circuit-switched transport schemes. Therefore, they control an MGW using the H.248 protocol. These servers do not provide any subscriber services. Within block 11, these servers are identified as Media Gateway Control Functions (MGCFs). These are illustrated in FIG. 1 as blocks 16 and 18.
- Servers that map between different types of protocols in order to bridge different transport schemes, and provide subscriber services as well. The subscriber services are provided either by using internal logic or by interacting with other nodes located in the service control plane. Within block 11, these servers are identified as a Mobile Switching Center (MSC) server 14 and as Gateway MSC (GMSC)/MGCFs 19–21, 22–23, and 24–25.
- Servers that map between different protocols operating on identical transport schemes. These servers do not control an MGW, and therefore have no MGC functionality. This type of server is illustrated in FIG. 1 as block 26.

A SIP server 12 is needed to handle SIP signaling in a pure SIP network; an H.323 gatekeeper (GK) 13 is needed to handle H.323 signaling in a pure H.323 network; and an MSC server 14 is needed to handle BICC, H.248, and $Iu^2$ interface signaling for Universal Mobile Telecommunication System (UMTS) and IS-136 Time Division Multiple Access (TDMA) networks. The MSC server also handles MAP, ANSI-41, and IP signaling with a Roaming Signaling Gateway (R-SGW) 15. The R-SGW converts SS7 to IP for ANSI-41 (mobile) call cases. The MSC server is used within the context of TDMA networks, Global System for Mobile Communications (GSM) networks having an IP transport scheme, and UMTS circuit-switched networks.

Several types of MGCFs are required in the call-control handler. In addition to call control, the main functions performed by the MGCFs are call-control protocol conversion and media gateway control using the H.248 protocol. Six MGCFs are illustrated to show the different types of protocol conversions required of an MGCF for different call scenarios.

A first MGCF (MGCF-1) 16 is needed to handle H.323 and H.248 signaling, as well as ISUP/IP signaling toward a Transit Signaling Gateway (T-SGW) 17. The T-SGW converts SS7 to IP for ISUP (non-roaming) call cases. A second MGCF (MGCF-2) 18 is needed to handle SIP and H.248 signaling, as well as ISUP/IP signaling toward the T-SGW. A third MGCF (MGCF-3) 19 interconnects an external network utilizing SS7 signaling to the circuit-switched portion of a 3G core network. Therefore, MGCF-3 is needed to handle BICC signaling toward the circuit-switched domain, H.248 signaling, and ISUP/IP signaling toward the T-SGW. MGCF-3 should be functionally combined with a Gateway MSC (G-MSC) 21 functionality which handles a subset of MAP, ANSI-41, and IP signaling for HLR interrogations. MGCF-3 performs all the MGC-specific functionalities: protocol conversion, address translation, bandwidth reservation and Media Gateway (MGW) control. The G-MSC is used only for incoming traffic into a home network, when the HLR interrogation is necessary to find a subscriber's location.

A fourth MGCF (MGCF-4) 22 interconnects H.323 networks to the circuit-switched portion of a 3G core network and is needed to handle BICC signaling toward the circuit-switched domain of the 3G core network, H.248 signaling, and H.323 signaling. Once again, MGCFs handling BICC signaling should be functionally combined with a G-MSC 23 that performs HLR interrogations. A fifth MGCF (MGCF-5) 24 interconnects SIP networks to the circuit-switched portion of a 3G core network and is needed to handle BICC signaling toward the circuit-switched domain of the 3G core network, H.248 signaling, and SIP signaling. Once again, MGCF 5 should be functionally combined with a G-MSC 25 that performs HLR interrogations. A sixth MGCF (MGCF-6) 26 is needed to handle SIP and H.323 signaling.

Communications such as interrogations 27 of Domain Name Servers (DNS) and Location Servers (LS) are common to all of the signaling systems. Likewise, each of the signaling systems is capable of utilizing the Bandwidth Broker protocol 28 with a bandwidth broker performing resource management (RM) functions for the purpose of coordinating Quality of Service (QoS) in IP networks.

Each of the protocols utilized by the various signaling systems have protocol-specific functionality. This creates a major problem for manufacturers of equipment such as media gateway controllers because different versions of the controllers must be designed for each unique set of protocols. Alternatively, to provide a single device in the network that is capable of converting between all of the specific protocols, with all of the protocol-specific functionality, would require an extremely large matrix of great complexity.

It would be advantageous to have a generic call server and method of converting protocols that simplifies the protocol conversion problem and handles call-control signaling between a plurality of different signaling systems. Such a server would enable equipment manufacturers to design a single version of devices such as media gateway controllers that would be compatible with a plurality of signaling protocols. The present invention provides such a generic call server and method.

SUMMARY OF THE INVENTION

In one aspect, the present invention is a generic call server in a telecommunications network for performing call-control functions and interfacing between any two network components selected from a plurality of network components that utilize a plurality of different signaling protocols. The call server includes a Generic Call-control State Machine (GCSM) that performs call-control functions that are common to all of the protocols, and a plurality of external signaling systems that interface between the GCSM and the selected network components and perform call-control functions that are specific to each protocol. The generic call server may also include a Media Gateway (MGW) Handler that acts as a media signaling protocol handling server and interfaces between the GCSM and a media gateway.

In another aspect, the present invention is a Generic Call-control State Machine (GCSM) in a telecommunications network for performing call-control functions that are common to a plurality of signaling protocols. The GCSM interfaces with a plurality of external signaling systems that perform call-control functions that are specific to each signaling protocol. The GCSM includes a plurality of call-control states that are common to all of the signaling protocols, each state having at least one defined internal signaling message that is sent to an external signaling system upon entering the state. The GCSM also includes at least one triggering event associated with each state, the triggering event causing the GCSM to enter the associated state.

In yet another aspect, the present invention is a method in a telecommunications network of performing call-control functions and interfacing between any two network components that utilize any two signaling protocols without redesigning the call-control logic that performs the call-control functions. The method performs call-control functions that are common to all of the protocols with a GCSM, and performs call-control functions that are specific to each protocol with a plurality of external signaling systems that are in communication with the GCSM. The GCSM communicates with the external signaling systems utilizing internal signaling messages. The method also includes the steps of converting between the internal signaling messages and selected protocol-specific messages in the external signaling systems, and communicating between the external signaling systems and the network components utilizing the protocol-specific messages.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 2:
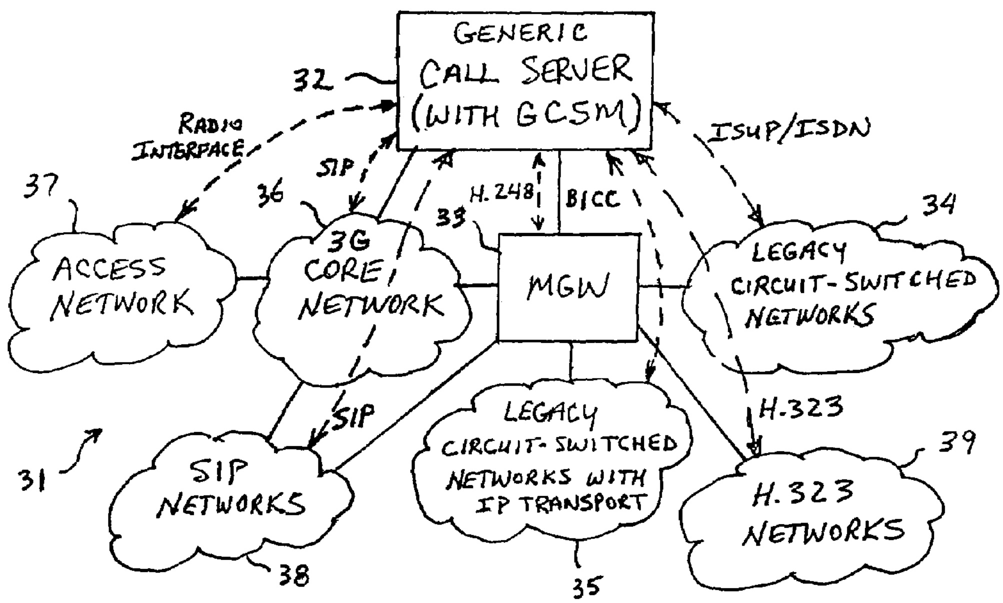
FIG. 2 is a simplified block diagram of a 2G/3G hybrid network in which the generic call server of the present invention has been implemented.

FIG. 2 is a simplified block diagram of a 2G/3G hybrid network 31 in which the generic call server 32 of the present invention has been implemented. In all of the call-control signaling protocols discussed above, there are some call-control functions that are specific to each protocol, and there are call-control functions that are common to all of the protocols. In the present invention, the common call-control functions are identified and from these, a Generic Call-control State Machine (GCSM) is created. The GCSM is implemented in the generic call server 32.

The generic call server 32 interfaces with a Media Gateway (MGW) 33. It also interfaces with pure legacy circuit-switched networks 34, legacy circuit-switched networks having an IP transport 35, pure packet-switched networks 36, and wireless access networks 37. The call server may communicate with one or more SIP networks 38 using SIP signaling, with legacy circuit-switched networks using ISUP/ISDN signaling, with legacy circuit-switched networks having an IP transport using BICC signaling, with one or more H.323 networks 39 using H.323 signaling, with MGWs using H.248 signaling, and finally with wireless access networks using the appropriate radio interface such as IS-136, and the like.

Figure 1:
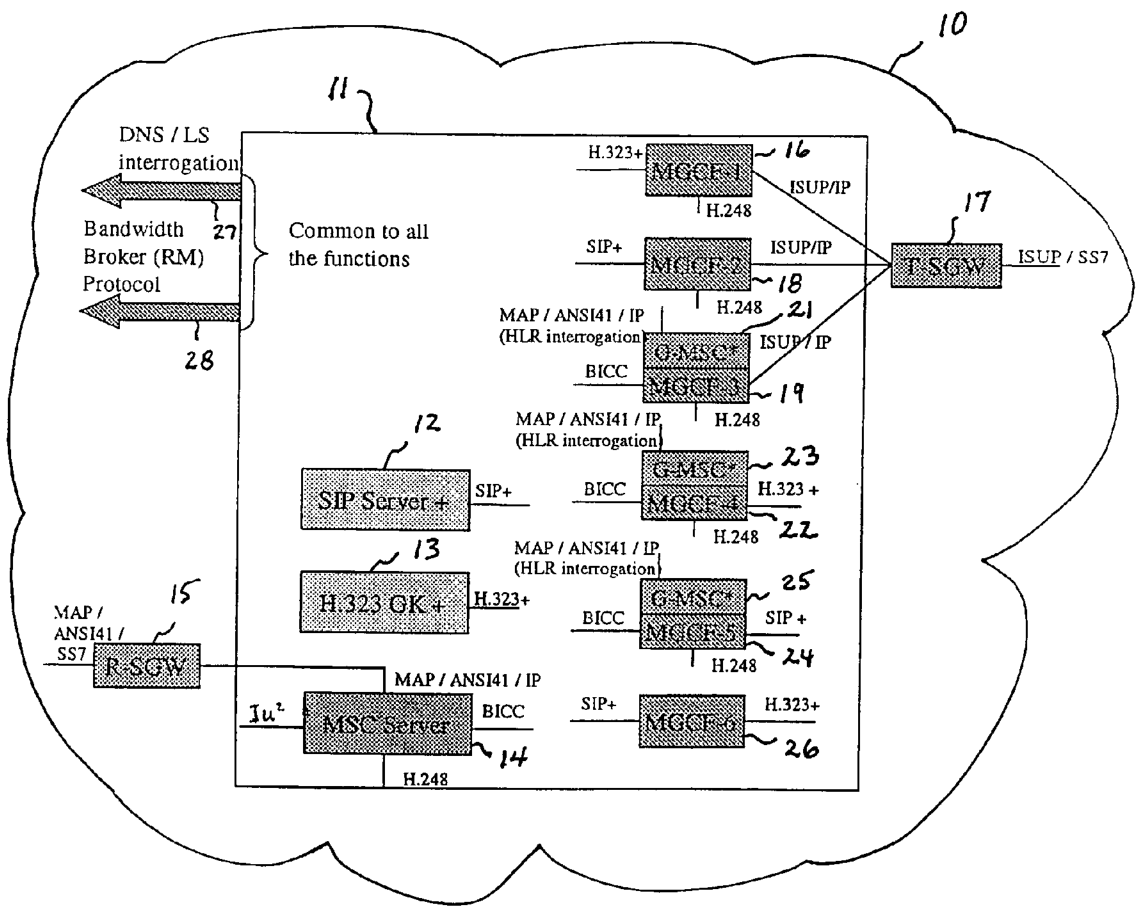
FIG. 1 (Prior Art) is a functional block diagram illustrating the various signaling components and protocols utilized in a typical 2G/3G hybrid telecommunications network.

Based upon an analysis of potential call cases, the conclusion is reached that the generic call server should follow the functional grouping illustrated in FIG. 1. In other words the server functionality and the media gateway controller (MGC) functionality should be co-located in the generic call server. The call server should also retain an option to split these functionalities when needed, since some operators may need server functionality or MGC functionality only. Other operators may need both. The call scenarios reveal intense call control signaling between MGCs and servers. By keeping this heavy signaling internal to the call server, at least two benefits are realized. First, the speed of call delivery is increased. Second, the MGC/server interfaces can be modified by the manufacturer without the need for standardization. It is also important that support for subscriber services can be optionally deactivated depending on the configuration of the generic call server.

Figure 3:
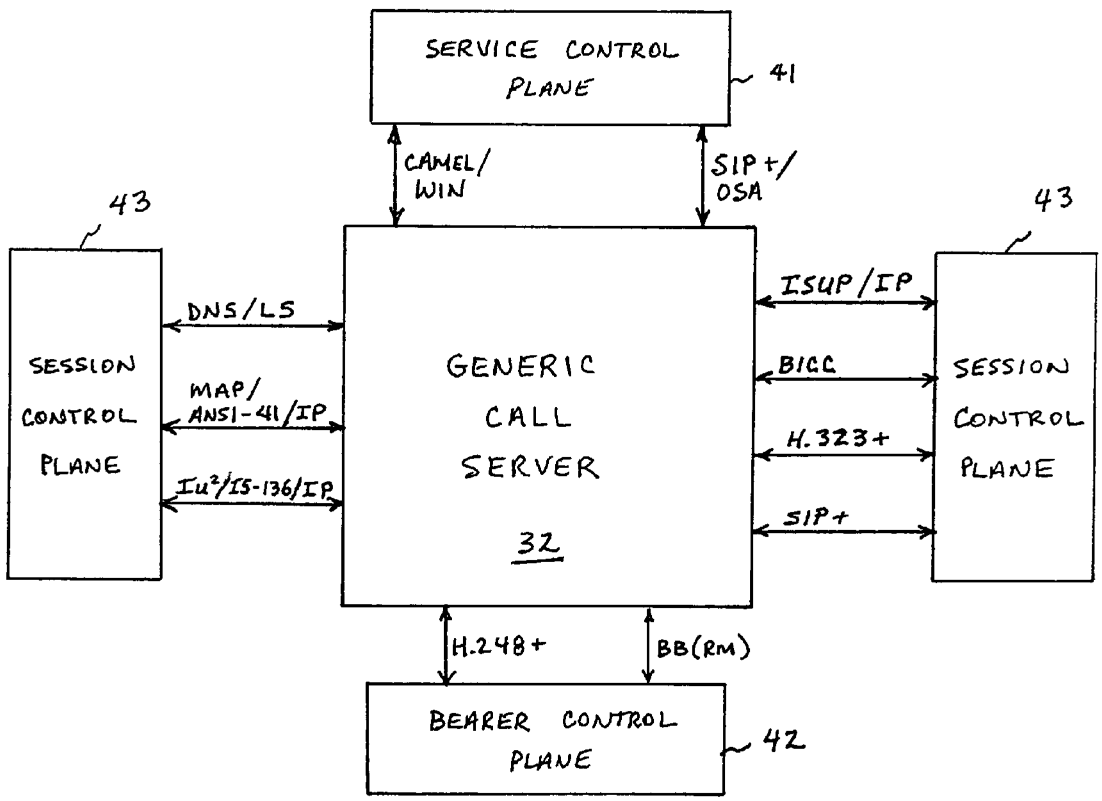
FIG. 3 is a simplified functional block diagram illustrating a plurality of signaling interfaces with the generic call server.

Based on the above considerations, the preferred embodiment of the generic call server 32 supports the plurality of signaling interfaces illustrated in FIG. 3. At any one time, session signaling utilizing one protocol may be coming in one side, while session signaling utilizing another protocol is going out the other side. Bearer control and service control signaling may also be going out the bottom or the top, as in the case when an MGW is involved. FIG. 3 illustrates the types of protocols that can be handled by the call server, based on the Third Generation Partnership Program (3GPP) model. The call server may interface with the service control plane 41 utilizing, for example, Camel—a protocol utilized with the Global System for Mobile Communications (GSM) or the Wireless Intelligent Network (WIN) protocol. The call server may also utilize the Open Service Architecture (OSA) protocol—a 3G Application Protocol Interface (API), or may utilize SIP. The call server may interface with the bearer control plane 42 utilizing, for example, H.248+, or the Bandwidth Broker (BB) protocol for performing resource management (RM) functions.

Within the session control plane 43, the generic call server may perform interrogations of Domain Name Servers (DNS) and Location Servers (LS), and may interface with other signaling systems utilizing the MAP/ANSI-41/IP protocols for mobile call cases, or the $Iu^2$/IS-136/IP protocols for UMTS and TDMA and GSM networks. These protocols may be converted in the call server to ISUP/IP, BICC/IP, H.323+, or SIP+ signaling to interface with other signaling systems on the session control plane.

It is clear from the above that it would be advantageous to have a family of call server products for the different standard signaling systems and different service planes. It would also be desirable for this family of products to share a generic common call-control state machine that is independent of specific signaling systems or specific service control plane.

Figure 4:
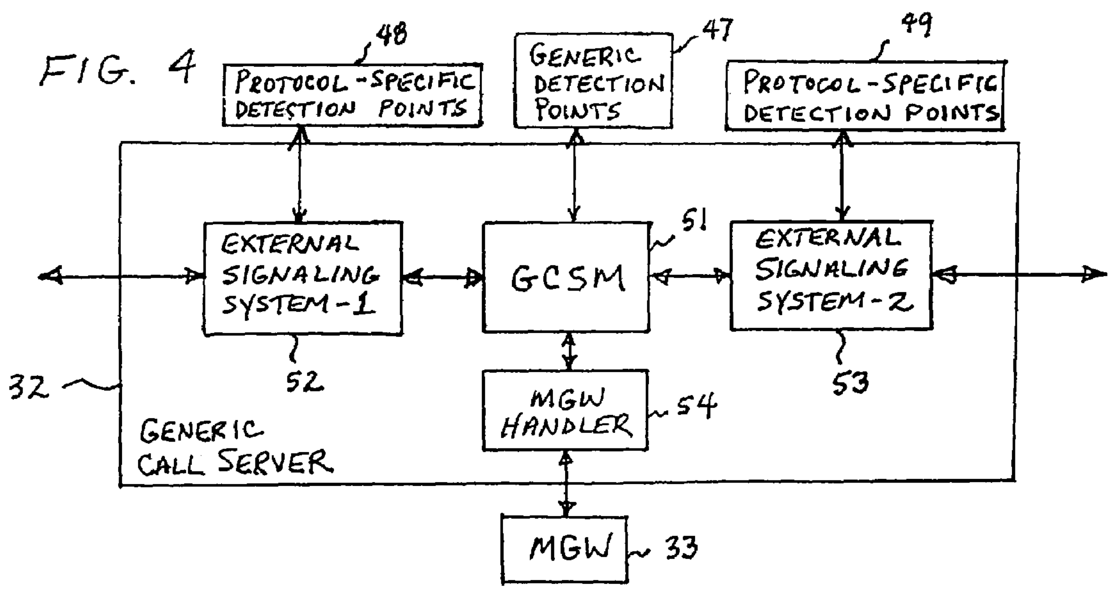
FIG. 4 is a simplified functional block diagram of the generic call server illustrating the relationship between a Generic Call-control State Machine (GCSM) and a plurality of external signaling systems within the generic call server.

FIG. 4 is a simplified functional block diagram of the generic call server 32 illustrating the relationship between a Generic Call-control State Machine (GCSM) 51 and a plurality of external signaling systems within the generic call server. The GCSM performs only the generic call processing functions that are common to all signaling protocols. External Signaling System-1 52 and External Signaling System-2 53 handle the specific functionality of whatever external protocols are being used in any particular situation, and may have their own state machines. Internal signaling is utilized between the GCSM and the External Signaling Systems. Thus, the GCSM is independent of the specific protocols utilized by the External Signaling Systems. The decoupling of the GCSM from the specific external signaling protocols enables the generic call server 32 to support a large number of signaling systems, and hence a large number of products, without modifying the GCSM. This enhances the operator's ability to reuse components and reduces overall development cost compared to the prior art method of developing specific call-control state machines tailored for every signaling protocol and every combination thereof.

A Media Gateway (MGW) Handler 54 acts as a media signaling protocol handling server. The GCSM 51 does not know what external signaling protocol is being utilized, and therefore always requests that a media context be created. If the external system is circuit-switched, there is no media gateway, so the MGW Handler immediately responds to the GCSM with a media acknowledgment message so that the next state transition may be triggered. If the external system is packet-switched, the MGW Handler uses the MGW 33 to create the media context. Thus, once again, the intelligence to deal with protocol-specific functionality is kept on the periphery of the GCSM.

The generic call server 32 includes generic detection points 47 related to the GCSM and protocol-specific detection points 48 and 49. The detection points may be adapted with one or more service adaptation layers to adapt the call server to specific protocols, depending on the upper layers (service layer) in each external protocol. This enables components to be reused without having to completely redesign the component for each combination of external protocols that is encountered.

Generic Call-Control State Machine (GCSM)

Figure 5:
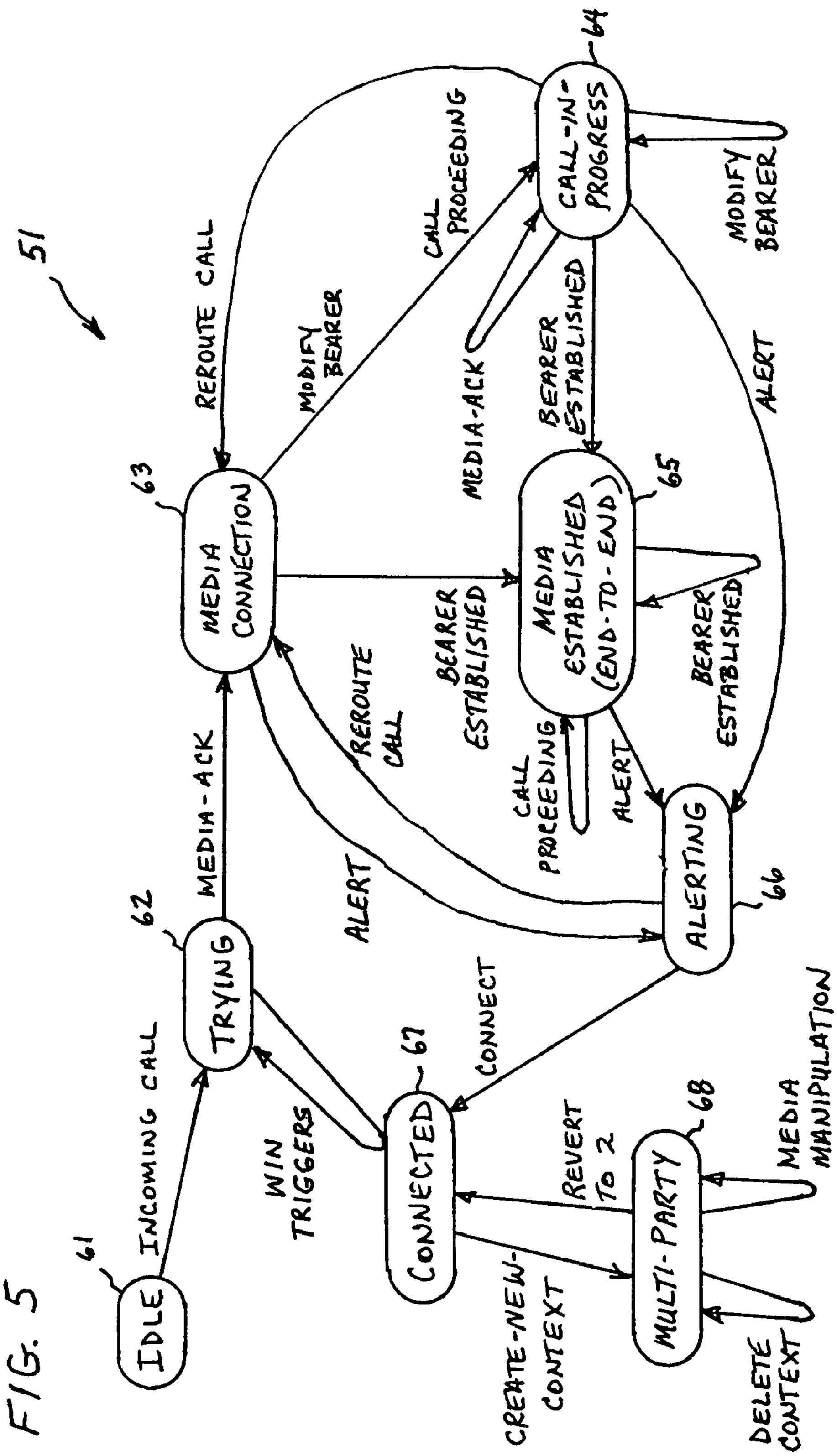
FIG. 5 is a signaling diagram and flow chart illustrating the functioning of the GCSM of the present invention.

FIG. 5 is a signaling diagram and flow chart illustrating the functioning of the GCSM 51 of the present invention. The state machine illustrates the different call states as well as the triggering events between states. The GCSM 51 is bearer-independent, and functions with both circuit-switched and packet-switched systems. Therefore, in some instances, the GCSM shows more than one triggering event or outcome out of a single state. As illustrated, the GCSM includes only normal call cases; abnormal call cases are not shown for purposes of clarity. Table 1 below illustrates a mapping table showing the application of the GCSM to different signaling systems, and illustrating the mapping from the internal signaling utilized in the GCSM to the different signaling protocols. The message acronyms are defined in the individual protocol specifications, and need not be further described herein. Whenever an internal signal does not have a corresponding match in a signaling system, it is ignored upon its reception.

As noted above, generic triggering events cause the GCSM to move from each generic state to another generic state as indicated in FIG. 5. The GCSM is assumed to be in the Idle state 61 when an Incoming Call event triggers the GCSM to move from the Idle state 61 to the Trying state 62.

Trying State

The Incoming Call event triggers the GCSM to move from the Idle state 61 to the Trying state 62. The Trying state performs a called-number analysis on the called destination number, and creates the necessary media contexts accordingly. In other words, an Add Context Message is sent to the MGW Handler 54, regardless of whether the MGW 33 is needed or not. The MGW Handler validates whether the external component requires a Media context creation. If not the MGW Handler responds by immediately sending a media acknowledgment (Media-Ack) to invoke a state change.

Media Connection State

When a Media-Ack event is received from the MGW Handler 54, the GCSM transitions to the Media Connection state 63. In the Media Connection state, an Outgoing Call Message is sent to the external signaling system handling the outgoing side. The external signaling system maps the Outgoing Call Message to the appropriate protocol message in accordance with the mapping table. Following that, the GCSM sends a Modify Bearer Message to the external signaling system handling the incoming side. Several possible transitions can occur from the Media Connection state. First, if a Call Proceeding event is received, then a transition occurs to the Call in Progress state 64. Second, if a Modify Bearer event is received, then a transition also occurs to the Call in Progress state. Third, if a Bearer Established event is received, then a transition occurs to the Media Established (End-to-End) state 65. Fourth, if an Alert event is received, then a transition occurs to the Alerting state 66 (as is the case in legacy IS-136 base stations or ISUP call control signaling).

Call-in-Progress State

Upon receipt of a Call Proceeding event or Modify Bearer event, the GCSM transitions to the Call-in-Progress state 64. The GCSM then issues a Modify Context Message to the MGW Handler 54. Certain scenarios may require that the GCSM add a new termination to the incoming side for an already existing media context or modify an existing termination. In these cases, a Media-Ack event is received in the Call-in-Progress state. If a Media-Ack event or a Modify Bearer event is received, then there is no state change, and no specific action is taken. Several possible transitions can occur from the Call-in-Progress state. First, if a Reroute Call event is received requesting that a call be re-routed to a different destination, then a transition occurs to the Media Connection state 63. Second, if a Bearer Established event is received (indicating that a media context has been added successfully, and media is connected End-to-End) then a transition occurs to the Media Established (End-to-End) state 65. Third, if an Alert event is received, then a transition occurs to the Alerting state 66.

Media Established (End-to-End) State

Upon receipt of a Bearer Established event, the GCSM transitions to the Media Established (End-to-End) state 65. There is only one transition associated with this state, and it occurs upon receipt of an Alert event, causing a state change to the Alerting state 66. The reception of a Bearer Established event or a Call Proceeding event entails no specific action. It is rather a notification that an end-to-end bearer has been successfully established.

Alerting State

Upon receipt of an Alert event, the GCSM transitions to the Alerting state 66. In this state, an Alert message is sent to the incoming side. There are two possible transitions associated with the Alerting state. First, if a Reroute Call event is received, then a transition occurs to the Media Connection state 63 requesting that a call be rerouted to a different destination. Second, if a Connect event is received indicating that the call is connected, then a transition occurs to the Connected state 67, which is the final state in a two-party call.

Connected State

Upon receipt of a Connect event, indicating that the called party has answered the call, the GCSM transitions to the Connected state 67. In this state, an Answer message is sent to the incoming side. There is one possible transition out of the Connected state, and it concerns the case where the call has been converted to a multiparty call. The transition to the Multi-Party state 68 occurs after a Create-New-Context event is received from the service logic setting up the multi-party call. The action associated with the event is to store all the necessary information. The actions associated with establishing the call to a third party are implemented by the service logic setting up the multi-party call.

Multi-Party State

Upon receipt of a Create-New-Context event, indicating that a third party is being added to the call, the GCSM transitions to the Multi-Party state 68. The Multi-Party state allows for centralized control of the Media with respect to the actions associated with a multiparty call. The service logic for the multiparty service will trigger those actions based on subscriber actions. There is one possible transition out of the Multi-Party state. It occurs upon receipt of a "Revert-to-2" event from the service logic implementing the multiparty service, indicating that the call is being converted to a two-party call. In this case, the GCSM transitions to the Connected state 67. The action associated with the Multi-Party state is to drop the indicated third party. Events such as Delete Context and Media Manipulation result in the required actions being executed, but do not result in a state transition.

EXAMPLE

Figure 6:
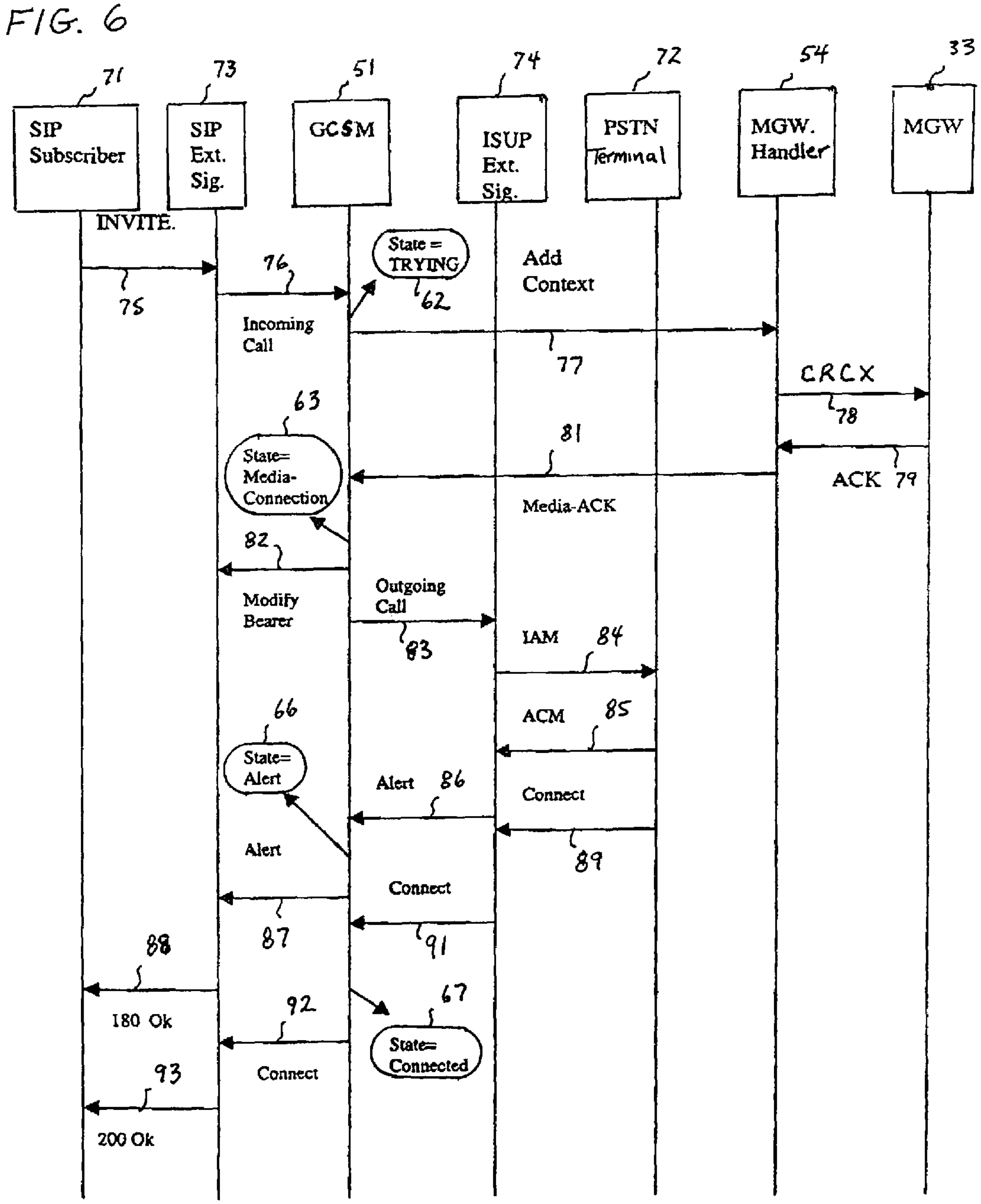
FIG. 6 is a message flow diagram illustrating the messages between network nodes, and state transitions in the GCSM, when the generic call server interconnects a SIP terminal and a PSTN terminal.

FIG. 6 is a message flow diagram illustrating the messages between network nodes and state transitions in the GCSM 51 when the generic call server 32 interconnects a SIP subscriber 71 and a PSTN terminal 72. With reference to FIG. 4, it can be seen that the SIP external signaling system 73 corresponds to External Signaling System-1 52, and the ISUP external signaling system 74 corresponds to the External Signaling System-2 53. Although the example is shown interconnecting the SIP protocol with the ISUP protocol, the example is equally applicable to interconnecting other signaling protocols such as H.323 and ISUP, and the like.

At step 75, the SIP Subscriber sends an INVITE message to the SIP external signaling system 73. The SIP external signaling system uses internal signaling in the generic call server to send an Incoming Call message 76 to the GCSM 51 in accordance with Table 1. Upon receipt of the Incoming Call message, the GCSM transitions to the Trying state 62. An Add Context message 77 is then sent to the MGW Handler 54. The MGW Handler sends a CRCX message to the MGW 33 to create a media context in accordance with Table 1. Upon receipt of an Acknowledgment message 79, the MGW Handler returns a Media-Acknowledgment message 81 to the GCSM.

Receipt of the Media-Acknowledgment message in the GCSM 51 causes the GCSM to transition to the Media Connection state 63. The GCSM then sends a Modify Bearer message 82 to the SIP external signaling system 73 using internal signaling. The GCSM also sends an Outgoing Call message 83 to the ISUP external signaling system 74 using internal signaling. The Modify Bearer message is ignored by the SIP external signaling system 73 in accordance with Table 1. At step 84, the ISUP external signaling system sends an ISUP Initial Address Message (IAM) to the PSTN terminal 72, which returns an ISUP Address Complete (ACM) message 85. The ISUP external signaling system then sends an Alert message 86 to the GCSM using internal signaling.

Receipt of the Alert message in the GCSM 51 causes the GCSM to transition to the Alerting state 66 and to send an Alert message 87 to the SIP external signaling system 73 using internal signaling. The SIP external signaling system then sends a SIP 180 Ok message 88 to the SIP subscriber 71 in accordance with Table 1. When the PSTN terminal 72 is ready to connect, it sends a Connect message 89 to the ISUP external signaling system 74. Then, at step 91, the ISUP external signaling system sends the Connect message to the GCSM using internal signaling.

Receipt of the Connect message in the GCSM 51 causes the GCSM to transition to the Connected state 67. The GCSM then sends a Connect message 92 to the SIP external signaling system using internal signaling, and the SIP external signaling system sends a SIP 200 Ok message 93 to the SIP subscriber 71 in accordance with Table 1.

It is thus believed that the operation and construction of the present invention will be apparent from the foregoing description. While the generic call server, state machine, and method shown and described has been characterized as being preferred, it will be readily apparent that various changes and modifications could be made therein without departing from the scope of the invention as defined in the following claims.

TABLE 1

Mapping Table

| Internal Signaling | External Signaling: ISUP | H.248 | H.323 | SIP | BICC | Wireless Access Server |
|---|---|---|---|---|---|---|
| Incoming Call Outgoing Call | IAM | — | Setup | Invite | IAM | Alert |
| Modify Bearer | — | — | Facility (H245)/Call Proceeding (H245) | — | APM | — |
| Media-ack | — | ACK | — | — | — | — |
| CallProceed-ing (Info) | CPG | — | Call Proceeding | RESPONSE: 100-Trying | | — |
| Alerting | ACM | — | Alerting | RESPONSE: 180-OK | ACM | Alert-Note 1 |
| Connect | ANM | — | Connect | RESPONSE: 200-Success | ANM | Answer |
| Release | REL | — | Release Complete | Cancel/BYE | REL | — |
| Add Context | — | CRCX Note 2 | — | — | — | — |
| Modify Bearer | — | MDCX | — | — | — | — |
| Bearer Established | | NOTIFY | | | | |
| Delete | — | DLCX | — | — | — | — |

Note 1:
Message is internally generated by wireless server toward the GCSM when server is informed that MS is ringing. Message is ignored when received from the GCSM.
Note 2:
The H.248 Server determines whether a destination requires Media setup. If not, server sends Ack immediately to allow the GCSM to go to the next state.

What is claimed is:

1. A generic call server in a telecommunications network for performing call-control functions and interfacing between any two network components selected from a plurality of network components that utilize a plurality of different signaling protocols, said call server comprising:

a Generic Call-control State Machine (GCSM) that performs call-control functions that are common to all of the protocols; and a plurality of external signaling systems that interface between the GCSM and the selected network components and perform call-control functions that are specific to each protocol.

2. The generic call server of claim 1 further comprising a Media Gateway (MGW) Handler that acts as a media signaling protocol handling server and interfaces between the GCSM and a media gateway.

3. The generic call server of claim 2 wherein some of the network components are in a packet-switched network and some of the network components are in a circuit-switched network, and the MGW Handler includes logic that immediately returns a media acknowledgment message to the GCSM when the GCSM requests that a media context be created, and the network component being interfaced with the GCSM is in a circuit-switched network.

4. The generic call server of claim 1 wherein the GCSM includes:

a plurality of call-control states that are common to all of the signaling protocols, each state having at least one defined internal signaling message that is sent to an external signaling system upon entering the state; and at least one triggering event associated with each state, the triggering event causing the GCSM to enter the associated state.

5. The generic call server of claim 4 wherein each of the plurality of external signaling systems includes means for converting internal signaling messages received from the GCSM to protocol-specific messages that are sent to the network components.

6. The generic call server of claim 5 wherein the means for converting internal signaling messages received from the GCSM to protocol-specific messages includes at least one adaptation protocol layer corresponding to the upper layers in each signaling protocol.

7. A generic call server in a telecommunications network for performing call-control functions and interfacing between a plurality of different network components that utilize a plurality of signaling protocols, said call server comprising:

a Generic Call-control State Machine (GCSM) that performs call-control functions that are common to all of the protocols, the GCSM including:

a plurality of call-control states that are common to all of the signaling protocols, each state having at least one defined internal signaling message that is sent to an external signaling system upon entering the state; and at least one triggering event associated with each state, the triggering event causing the GCSM to enter the associated state;

a plurality of external signaling systems that perform call-control functions that are specific to each protocol, and interface between the GCSM and the network components; and a Media Gateway (MGW) Handler that acts as a media signaling protocol handling server and interfaces between the GCSM and a media gateway.

8. In a telecommunications network, a Generic Call-control State Machine (GCSM) for performing call-control functions that are common to a plurality of signaling protocols, said GCSM interfacing with a plurality of external signaling systems that perform call-control functions that are specific to each signaling protocol, said GCSM comprising:

a plurality of call-control states that are common to all of the signaling protocols, each state having at least one defined internal signaling message that is sent to an external signaling system upon entering the state; and at least one triggering event associated with each state, the triggering event causing the GCSM to enter the associated state.

9. In a telecommunications network in which call-control logic is utilized to perform call-control functions, and a plurality of different network components utilize a plurality of different signaling protocols, a method of performing the call-control functions and interfacing between any two components utilizing any two protocols without redesigning the call-control logic, said method comprising the steps of:

performing call-control functions that are common to all of the protocols with a Generic Call-control State Machine (GCSM);

performing call-control functions that are specific to each protocol with a plurality of external signaling systems that are in communication with the GCSM;

communicating between the GCSM and the external signaling systems utilizing internal signaling messages;

converting between the internal signaling messages and selected protocol-specific messages in the external signaling systems; and communicating between the external signaling systems and the network components utilizing the protocol-specific messages.

* * * * *